Aug. 23, 1949.   A. J. SEATON   2,480,055
STUFFING BOX CONSTRUCTION
Filed Feb. 7, 1946
FIG. 1.
FIG. 2.
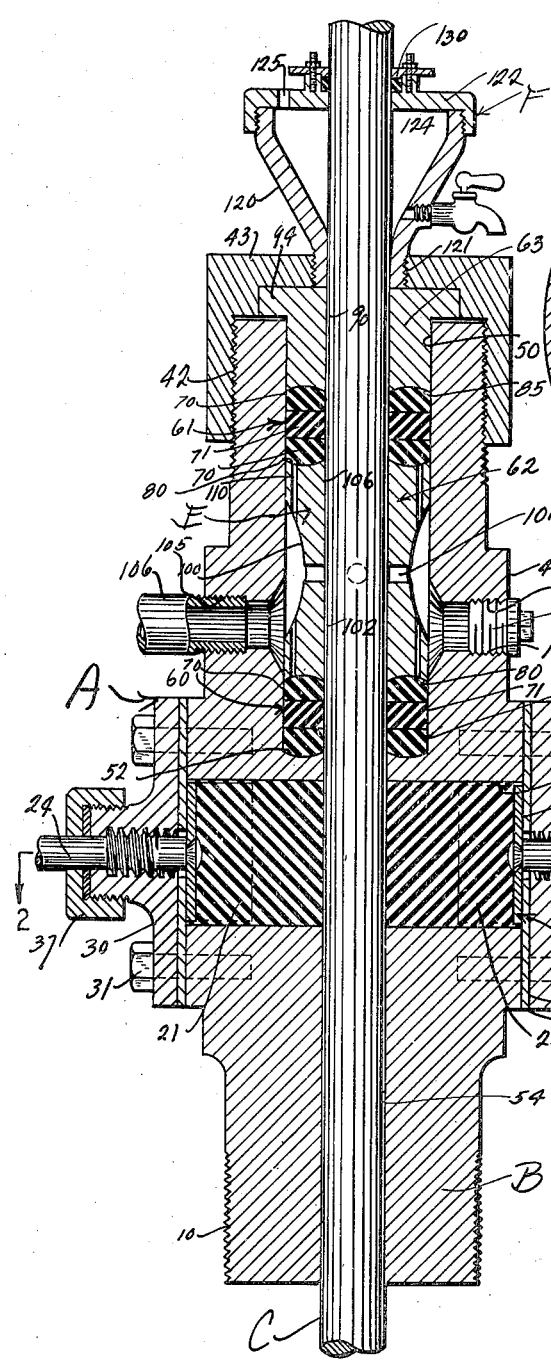
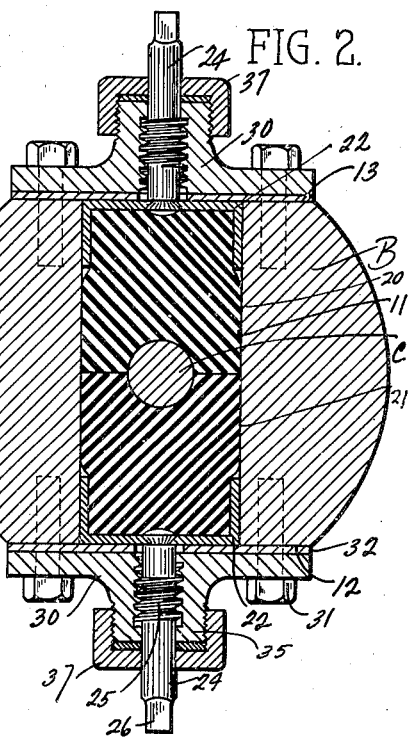
Inventor
ALEX J. SEATON
By Lancaster, Allwine & Rommel
Attorneys Patented Aug. 23, 1949

2,480,055

UNITED STATES PATENT OFFICE 2,480,055

STUFFING BOX CONSTRUCTION

Alex J. Seaton, Choctaw, Okla.

Application February 7, 1946, Serial No. 646,003

1 Claim. (Cl. 286—27)

This invention relates to improvements in lubricated stuffing box structures.

The primary object of this invention is the provision of an improved stuffing box construction for use in connection with oil well pumping equipment.

Other objects and advantages of the invention will be apparent from the following detailed description.

In the accompanying drawing forming a part of this specification and wherein similar reference characters designate corresponding parts throughout the several views, Figure 1 is a vertical cross sectional view taken through the improved stuffing box construction showing the same associated within a casing receiving a pumping or polish rod therethrough.

Figure 2 is a transverse cross sectional view taken substantially on the line 2—2 of Figure 1.

In the drawing, wherein for the purpose of illustration is shown only a preferred embodiment of the invention, the letter A may generally designate the improved lubricating and stuffing box structure which may include a casing B reciprocably receiving a conventional pumping line carriage rod C. The casing B has associated therewith a seal-off or pack-off structure D and an improved stuffing box structure E having associated therewith a lubricator F.

The casing B may include an externally screw threaded lower end portion 10 which may be received within a casing head or other well structure. Above the shank 10 the casing B is provided with a transverse passageway 11 diametrically therethrough adapted to receive the pack-off rubbers of the seal-off construction D, as will be subsequently mentioned. The external surfacing of the casing B at the outlets of this passageway 11 is flattened at 12 and 13 at diametrically opposed sides, for receiving certain details of the construction D.

The seal or pack-off construction is utilized for shutting off gases to prevent blowouts at times when access must be had to the stuffing box structure for replacement or repair, etc., and during other periods for purposes well understood by those skilled in the art to which this invention relates.

The seal-off construction D preferably includes rectangular blocks of rubber or other impervious sealing material, designated at 20 and 21, the facing surfaces of which are suitably socketed to receive the pump rod C. The outer ends of the blocks are provided with substantially U-shaped metal caps 22 permanently secured thereto. Each cap 22 centrally thereof receives in swiveled arrangement an adjusting screw or bolt 24 externally provided with screw threads 25 and having an outer end 26 for receiving a wrench or other means by which the same may be turned.

The pack-off construction D furthermore includes clamping plates 30 of substantially rectangular formation secured by bolts 31 upon the outer flat surfaces of the casing B; suitable gaskets 32 being secured between the same and the surfacing 12 and 13. These plates 30 clamp the packing blocks 20 and 21 in position and they have internally threaded shanks 35 for receiving the threads 25 of the adjustable bolts 24. A gasket compressed cap 37 is externally screw threaded on each shank 35 to prevent leakage at this point.

It is apparent from the foregoing that by adjusting the bolts 24 the packing blocks may be moved into packing engagement against the polish rod or slightly spaced therefrom to permit reciprocation. This spacing is not shown in the drawing because it need only be of sufficient dimension to prevent friction.

The casing structure B upwardly above the seal-off construction is externally reduced at 40 and at its upper end it is further reduced and externally screw threaded at 42 for receiving a stuffing box cap 43. The casing B inwardly from its top is provided with a chamber 50 of preferably uniform diameter having a bottom surface surrounding the passageway of the lower body of the casing through which the pump rod extends, and this surface designated at 52 is concavo-convex in cross section in any radial plane surrounding the passageway 54.

The stuffing box structure for the top of the casing B preferably includes a lower packing arrangement 60; a like upper packing arrangement 61; an intermediate gland 62; and a top gland 63 above the packing structure 61 and beneath the stuffing box cap 43.

The gasket sets 60 and 61 each include upper and lower gaskets 70 and an intermediate gasket 71. They may be of conventional flat formation, or the outer sides of the gaskets 70 may be of convex formation, as shown. The opposite end surfaces of the gland 62 are concavo-convex in radial cross section, as shown at 80, similar to the cross section of the gasket seating surface 52 above described. Furthermore, the under surfacing of the gland 63 is concavo-convex in radial cross section beyond the pump line passageway 90.

The gland 63 has a cylindrical body with an annular top flange 94 adapted to be received in the under socket or under cut of the stuffing box cap 43.

It is apparent from so much of the above description of the parts as has been given that the stuffing box cap when adjusted upon the top of the casing B will force the packing rings exposed to the concave surfacing 52, 18 and 85 into a convex formation. This is quite important in that as the pump rod reciprocates through the packing ring there will be a lateral compressive thrust against the upper and lower rings of each set, due to the convexity with which the said rings fit in the concaved seats of the gland and the casing. The forcing of the rubber laterally outwardly prevents deterioration of these glands. This is in contradistinction to flat surface compression of packing rings, which tend to pull out of place annularly around the passageway thereof, due to action of the pump rod. Therefore, there will be less necessity for replacement of packing rings; stoppage of the equipment and, of course, more efficient operation will result.

The intermediate packing gland 62 is of rather unique formation. Its upper and lower ends are of a dimension to snugly fit in the passageway 50 of the casing, and intermediate these end portions the same is annularly grooved at 100; the groove, in cross section being segmental-shape. Midway between its ends the gland 62 is provided with radial openings 101 opening into the passageway 102 through the gland and also into the groove 100.

The casing B is provided with internally screw threaded diametrically opposed ducts 105, one of which may receive a feed line 106 of a lubricating arrangement and the other of which may detachably receive a plug 107. The latter may be removed to replace the lubricator at this side of the casing, if so desired. The lubricator feed line 106, of course, feeds lubricant to the groove 100 and therefrom through the ducts or passageways 101 onto the polish rod.

Since pumping equipment of this kind is ordinarily heavy, I may provide tool receiving passageways 110 at each end of the gland for insertion of a proper tool to lift the gland out of the passageway 50 when occasion requires.

The cap 43 may be externally provided with wrench faces or sockets to receive any type of wrench desired.

The lubricator F preferably consists of a casing 120 having an externally threaded shank 121 for screw threading in the screw threaded opening in the top wall of the cap 43. The casing 120 tapers upwardly with an increasing diameter and at its top it receives a cap 122. The lubricator casing and cap are provided with passageways therethrough to receive the pump line, as shown, and an annular chamber 124 is provided for receiving lubricant or oil which may be admitted through a feed opening 125. The top wall of the cap 122 may be provided with a suitable wiper ring packing 130.

It will be apparent to those skilled in the art that a very compact seal-off and lubricator stuffing box arrangement has been provided for oil well pump lines wherein the need for frequent replacement of stuffing box parts has been largely eliminated. During the period when the well pumping equipment is operating, but oil not flowing, the lubricators and oilers will, of course, supply oil to the packing and to the pump line.

Various changes in details may be made to the form of invention herein shown and described without departing from the spirit of the invention or the scope of the following claim.

I claim:

In a stuffing box construction for pump lines the combination of a pump line having a casing with a chamber therein, annularly surrounding the pump line which is received therethru, said casing having an annular seat therein at one end of the chamber, packing means in said chamber upon said seat, a gland resting upon said packing, a second packing from the gland at the opposite side thereof with respect to the first mentioned packing, means sealing off the casing at the opposite side of the second packing from the said gland and surrounding said pump line, said gland having an annular passageway intermediate the ends thereof and surrounding said gland, said casing having lubricating means for directing lubricant into said annular passageway, said gland having ports leading directly from said passageway onto the pump line, and said gland having other ports relatively unrelated to the first mentioned ports opening directly from said annular passageway onto the first and second mentioned packings.

ALEX J. SEATON.

REFERENCES CITED

The following references are of record in the file of this patent:

UNITED STATES PATENTS

| Number | Name | Date |
|---|---|---|
| 163,796 | Meyers | May 25, 1875 |
| 774,270 | Palmer | Nov. 8, 1904 |
| 968,132 | Coyne et al. | Aug. 23, 1910 |
| 1,585,087 | Deems | May 18, 1926 |
| 1,721,806 | Crowell | July 23, 1929 |
| 1,800,833 | Huff | Apr. 14, 1931 |
| 2,258,887 | Fortune | Oct. 14, 1941 |
| 2,266,935 | Stephens et al. | Dec. 23, 1941 |
| 2,321,927 | McCoy et al. | June 15, 1943 |